US007340754B2

(12) United States Patent
Yamauchi et al.

(10) Patent No.: US 7,340,754 B2
(45) Date of Patent: Mar. 4, 2008

(54) DISK DRIVE DEVICE

(75) Inventors: Yoshiaki Yamauchi, Minori (JP); Hideyuki Onuma, Urayasu (JP); Makoto Ibe, Hitachinaka (JP); Shinya Tsubota, Mito (JP); Kuniyuki Kimura, Fujisawa (JP)

(73) Assignees: Hitachi, Ltd., Tokyo (JP); Hitachi-LG Storage, Inc., Tokyo (JP)

( * ) Notice: Subject to any disclaimer, the term of this patent is extended or adjusted under 35 U.S.C. 154(b) by 467 days.

(21) Appl. No.: 11/044,108

(22) Filed: Jan. 26, 2005

(65) Prior Publication Data

US 2006/0090177 A1 Apr. 27, 2006

(30) Foreign Application Priority Data

Oct. 26, 2004 (JP) ............................ 2004-310276

(51) Int. Cl.
*G11B 33/08* (2006.01)

(52) U.S. Cl. ...................................................... 720/651

(58) Field of Classification Search ................ 720/651, 720/603, 611, 614, 732; 369/75.2
See application file for complete search history.

(56) References Cited

U.S. PATENT DOCUMENTS 5,140,579 A * 8/1992 Suzuki et al. ............... 720/611
5,970,036 A * 10/1999 Matsugase .................. 720/614
6,392,976 B1 * 5/2002 Lin ............................ 720/611
6,529,461 B1 * 3/2003 Watanabe et al. ........... 720/732
2001/0043542 A1 * 11/2001 Omori et al. ............. 369/75.2
2002/0024910 A1 * 2/2002 Shiomi ...................... 369/75.2
2005/0039198 A1 * 2/2005 You ........................... 720/603

FOREIGN PATENT DOCUMENTS

JP 10-208357 8/1998

* cited by examiner

*Primary Examiner*—Tianjie Chen
(74) *Attorney, Agent, or Firm*—Townsend and Townsend and Crew LLP

(57) ABSTRACT

In an optical disk drive device, in order to reduce structural vibration noise and aerodynamic sound during high-speed revolution, a recess is formed at the deeper end. This recess is in a position axially symmetric to a hole for the movement of an optical head with respect to the axis of a spindle motor, and its size is substantially equal to that of the movement hole. This recess serves to suppress the vibration mode of a disk tray and the air flow between the disk and the disk tray. Noise is reduced even when the disk is turning at high speed.

1 Claim, 4 Drawing Sheets

DISK DRIVE DEVICE

BACKGROUND OF THE INVENTION

1. Field of the Invention

The present invention relates to a disk drive device for driving a commutative medium such as a CD or a DVD, and more particularly to a disk drive device of not more than 9.5 mm in its thickness.

2. Description of the Related Art

An example of conventional disk drive devices is described in JP-A-10-208357. In the disk drive device described in this patent publication, a loaded disk is mounted on a turntable attached to a spindle motor. After that, the whole of a unit mechanism having an optical head for reproducing or recording information is moved up and down, and the unit mechanism is controlled so as to set the gap between the head and the disk surface to a prescribed distance. The means of moving the unit mechanism up and down has a sloped cam piece, and a projection protrudes from the top face of this sloped cam piece. When the disk is loaded, the projection is brought into contact with the under face of the disk tray to press the disk tray toward the frame.

In a CD or DVD reproducing/recording device whose thickness is 12.7 mm or less, a unit mechanism provided with a spindle motor, an optical head and optical head moving means is elastically supported to the under face of the disk tray through insulators. The disk tray integrated with the unit mechanism is used for ejecting the disk out of the device. When the mechanism described in the above patent publication is to be applied to such a thin disk drive device, moving the up-and-down mechanism is made difficult by physical limitation.

On the other hand, with this limitation of the disk drive device thickness being taken into account, if the disk tray itself is reduced in thickness, the primary vibration of revolutions, the aerodynamic vibromotive force accompanying the revolutions of the disk or the vibration caused by the seeking of the optical head during high-speed revolutions of the disk may invite self-excited vibration of the disk tray and resultant generation of noise. Moreover, a reduced thickness of the disk drive device may be highly capable of bringing components included in the disk drive device into contact or interference with one another. For instance, it would become necessary to prevent the disk tray from coming into contact with electrical components mounted on a circuit board disposed underneath this disk tray.

BRIEF SUMMARY OF THE INVENTION

An object of the present invention, attempted in view of the problem with the related art noted above, is to reduce structural vibration noise and aerodynamic sound that may arise in an optical disk drive device of no more than 12.7 mm in thickness when the disk is turning at high speed.

In order to achieve the object stated above, according to a first aspect of the invention, there is provided a disk drive device using an optical head for recording information into or reproducing information out of a disk, wherein a recess is formed in the vicinity of a deeper end of a disk tray for mounting a disk, and the area of this recess is so set as to match the area of a hole for movement which is formed in the disk tray when the optical head moves.

In this first aspect of the invention, the recess may be formed at the deeper end of a disk tray and substantially at the center in the transverse direction; the recess may formed in one corner on the deeper side of the disk tray and in a position axially symmetric to the position where the hole for movement is formed with respect to the center of the disk; or the recess may be formed in the disk mounting part of the disk tray, with the outer circumference of the disk mounting part adjacent to the recess being consecutive. Or, a side wall portion perpendicular to the disk mounting part of the disk tray may be removed by the recess, and a member having a side wall portion matching this removed side wall portion is provided on either a top cover or a bottom cover for accommodating the disk tray. Further, in any of the foregoing, it is preferable for the size of the recess formed in the disk tray to be in a range of 15 to 30 mm both inclusive in width and in a range of 5 to 20 mm both inclusive in length in the direction toward the inner part.

In order to achieve the object stated above, according to a second aspect of the invention, there is provided a disk drive device using an optical head for recording information into or reproducing information out of a disk, wherein a recess is formed in the outer circumference of a disk tray for carrying a disk in and out, the recess serving to suppress at least either one of the vibration mode of this disk tray and the air flow between the disk and the disk tray.

In this aspect, it is preferable for the disk drive device to further have a spindle motor for rotationally driving the disk, moving means for driving the optical head in the radial direction of the disk, and a circuit board on which a control unit for controlling the optical head and moving means is formed, this circuit board being arranged at the deeper end of the disk tray in its moving direction and the recess being formed above the circuit board. It is further preferable for the size of the recess to be in a rage of 15 to 30 mm both inclusive in width and in a range of 5 to 20 mm both inclusive in length.

At least part of the recessed wall of said recess, the recessed wall being in a direction substantially at a right angle to the direction of the air flow generated by the revolution of the disk, may be tapered.

According to the invention, since the disk tray has a recessed structure to make the vibration mode of the disk tray controllable, self-excited vibration of the disk tray during high-speed revolution of the disk can be suppressed. Or, as the air flow between the disk and the disk tray is made controllable, the flow between the disk and the disk tray can be stabilized. These features can serve to reduce noise during high-speed reproducing and recording, and thereby contribute to enhancing the reliability of the disk drive device. Furthermore, the recess in the disk tray enables the disk tray to avoid coming into contact with other structural components and the disk drive device to be reduced in thickness.

Other object, features and advantages of the invention will become apparent from the following description of the embodiments of the invention taken in conjunction with the accompanying drawings.

DESCRIPTION OF THE PREFERRED EMBODIMENTS

Figure 1:
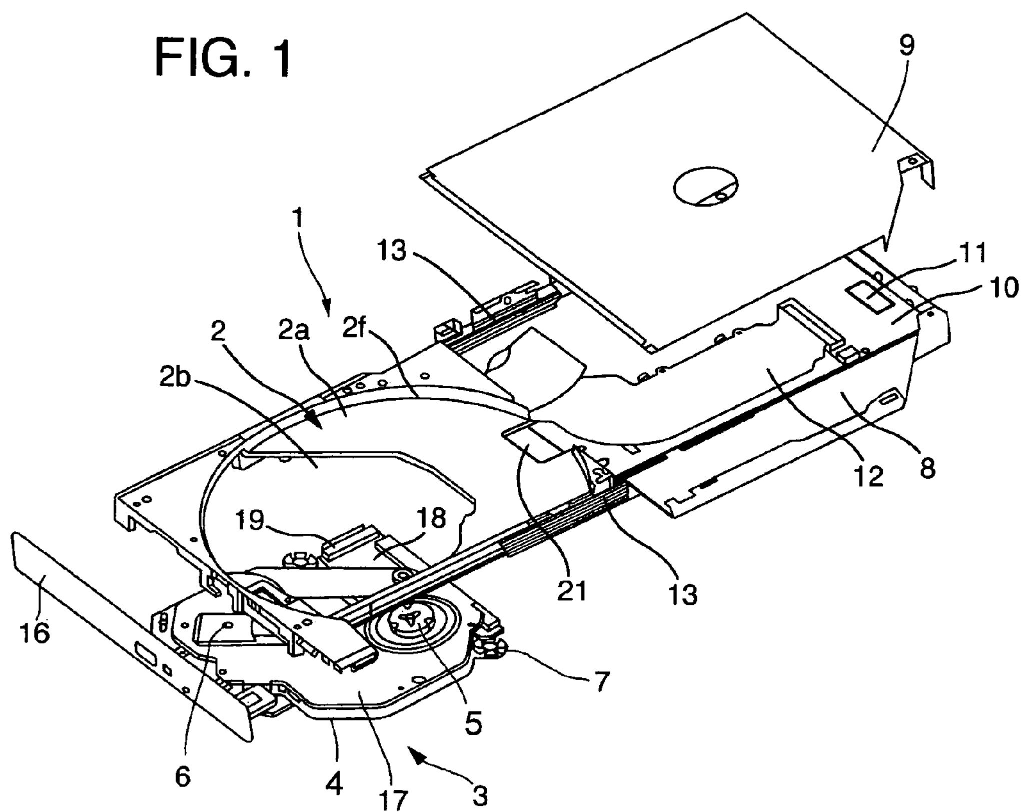
FIG. 1 is an exploded perspective view of one embodiment of a disk drive device according to the present invention.
Figure 2:
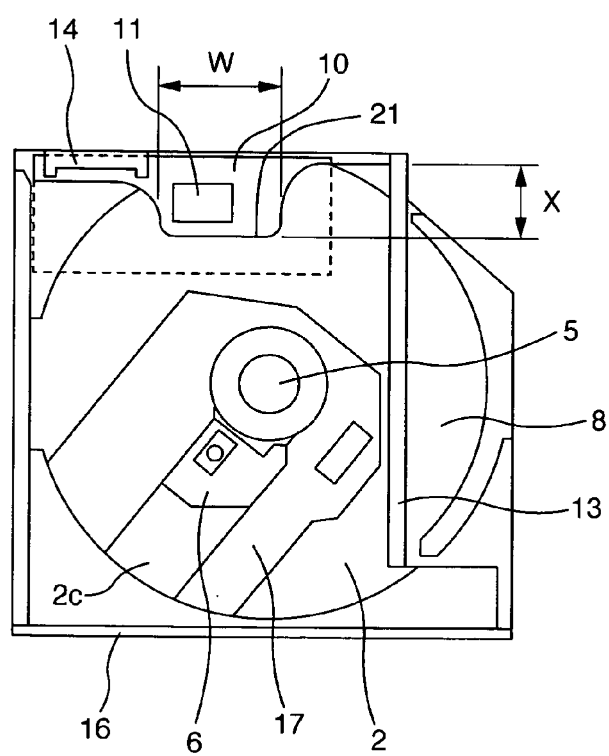
FIG. 2 is a top view of the disk drive device shown in FIG. 1, with its top cover removed.
Figure 3A:
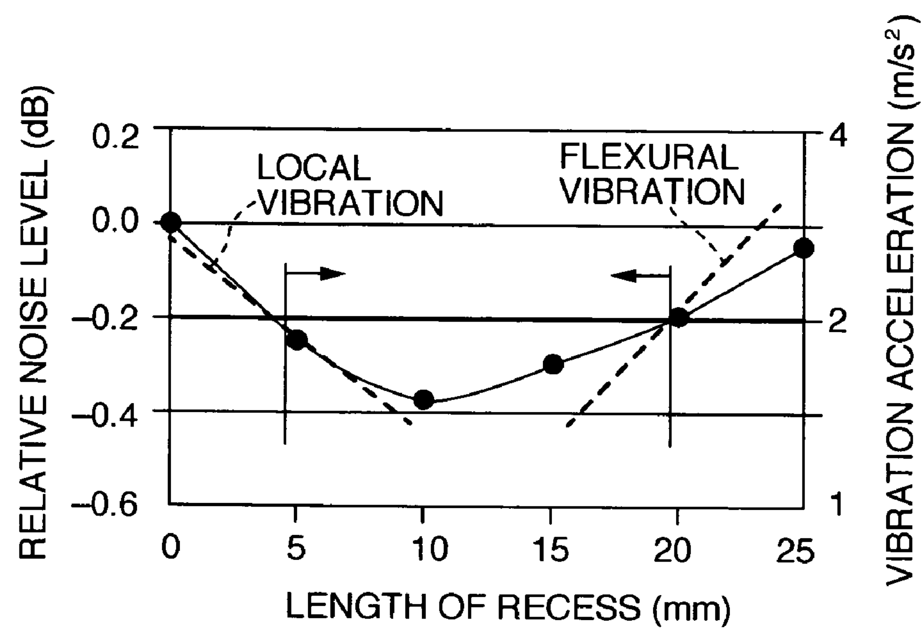
FIGS. 3A and 3B illustrate the relationship between noise characteristics and the disk tray structure varying with the dimensions of the recess structure.
Figure 3B:
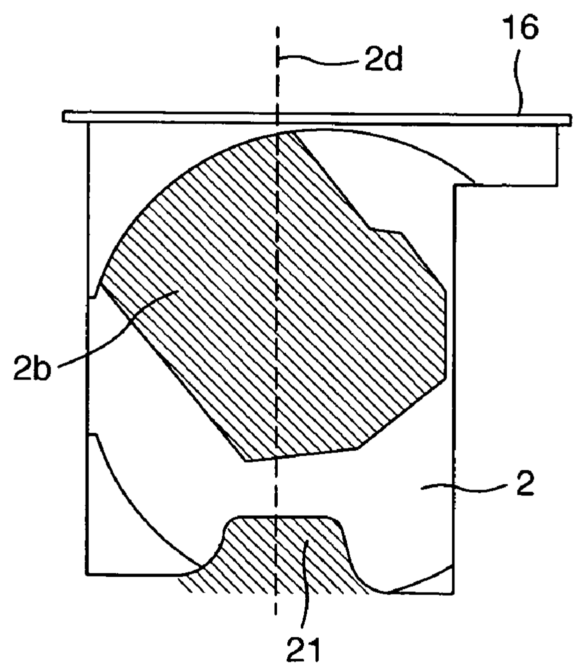

A number of disk drive devices, which are preferred embodiments according to the present invention, will be described below with reference to FIG. 1 through FIG. 6. FIG. 1 is an exploded perspective view of a disk drive device 1 according to the present invention. FIG. 2 is a top view of the disk drive device 1 shown in FIG. 1, with its top cover 9 removed. FIGS. 3A and 3B illustrate the influence of the length of a recess 21 formed in a disk tray 2; FIG. 3A is a view, in which the horizontal axis represents the recess length, and the vertical axis, the noise characteristics and the vibration acceleration, while FIG. 3B illustrates the vibration mode.

Figure 4A:
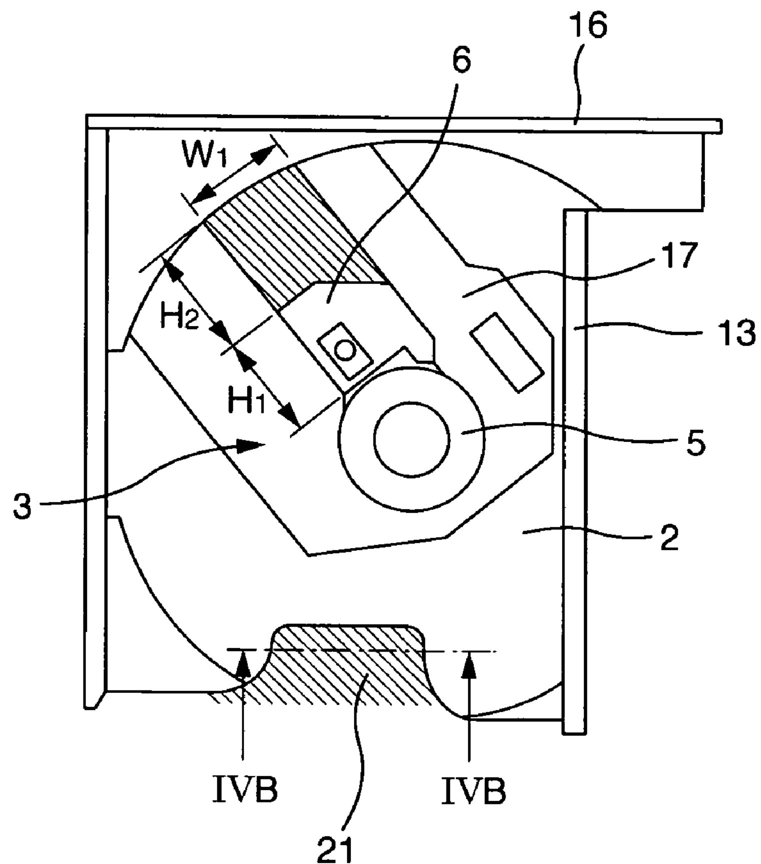
FIGS. 4A and 4B are a top view and a side view, respectively, of a disk tray for use in the disk drive device shown in FIG. 1.
Figure 4B:
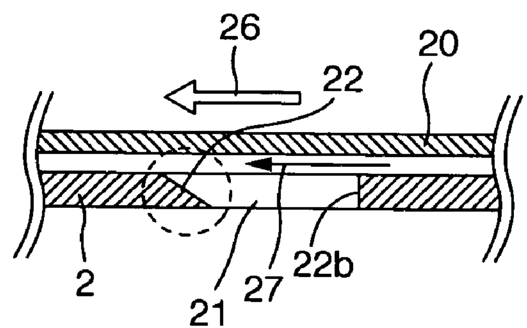
Figure 5:
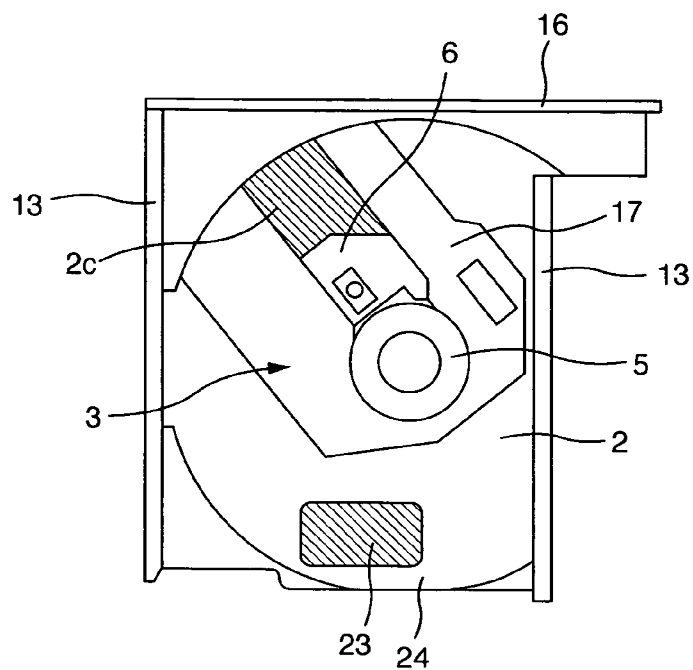
FIG. 5 is a top view of another embodiment of the disk tray.
Figure 6:
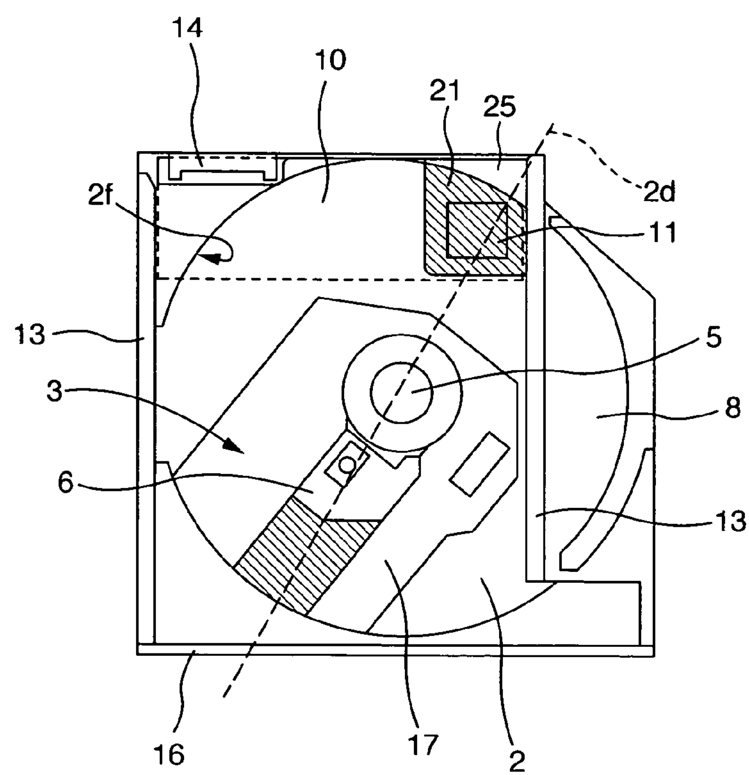
FIG. 6 is a top view of still another embodiment of the disk drive device, with its top cover removed.

FIGS. 4A and 4B are a top view and a side view, respectively, of the disk tray 2. FIG. 5 is a top view of another embodiment of the disk tray. FIG. 6 is a top view of still another embodiment of the disk tray, with its top cover 9 removed. Incidentally, FIG. 4 and FIG. 5 show, in order to facilitate description of the positional relationship between the recess 21 formed in the disk tray 2 and a unit mechanism 3, a state in which the unit mechanism 3 is incorporated. The following description refers to the disk drive device 1 for CDs, DVDs or the like.

The disk drive device 1 for CDs, DVDs or the like to be incorporated into a personal computer or the like reproduces information recorded in a medium having a disk shape of 120 mm in diameter and 1.2 mm in thickness (hereinafter referred to as the disk 20) or records new information into the disk 20. The disk drive device 1 to which present invention pertains is what is commonly known as a slim drive or a super-slim drive. In this case, the thickness of the disk drive device 1 is 12.7 mm, 9.5 mm or even less.

The disk drive device 1 measuring 9.5 mm in thickness is shown in FIG. 1. The external dimensions of the disk drive device 1 are about 130 mm in width and 130 mm in length; its external case is formed by fitting the top cover 9 to a bottom cover 8, each of which top and bottom covers is formed by pressing a thin metal sheet. The disk tray 2 molded of resin is movably housed in the case. The disk tray 2 is guided by guide mechanisms 13 disposed on both inner sides within the bottom cover 8. Thus the tray is slidably supported by the guide mechanisms 13 to enable the disk 20 to be moved in and out, thereby to be loaded and unloaded.

A front panel 16, which is a separate component, is fitted to the disk tray 2 on a front side. A circular groove 2*a* slightly larger than the outer diameter of the disk 20 is formed substantially at the center of the disk tray 2. A hole 2*b* for fitting the unit mechanism 3 is formed from the center of the circular groove 2*a* to a side 2*f* of the circular groove 2*a*.

The unit mechanism 3 is provided with a spindle motor 5 for rotationally driving the disk 20; a turntable for supporting the disk 20; an optical head 6 for reproducing information out of, or recording information into, the disk 20; drive means for moving the optical head 6 to a prescribed position in the radial position of the disk 20; and a unit cover 17 for preventing contact from outside with any component and preventing electrical noise. These components are incorporated into a mechanism chassis 4. The unit mechanism 3 is fitted to the under face of the disk tray 2 via three insulators 7, which are elastic members. The insulators 7 attenuate vibrations and impacts transmitted from outside the disk drive device 1 to the unit mechanism 3 or from the unit mechanism 3 to outside.

The main circuit board 10 of the disk drive device 1 is fitted to the rear part of the bottom cover 8 with screws. To electrically connect the spindle motor 5, the optical head 6, optical head moving means and the circuit board 10, a connector part 19 provided on a spindle motor base 18 and the main circuit board 10 are connected by an FPC 12. Many electrical components are mounted on the main circuit board 10, including an IC component 11 of which the area is from about 5 mm square to 20 mm square and the height is about 1 mm. Therefore in this embodiment, with the dimensional limitation in the direction of the thickness of the disk drive device 1 taken into account, a recess 21 is formed in a part of the disk tray 2 to avoid contact with the disk tray 2. The size of this recess is set to be not smaller than 15 mm but not greater than 30 mm in width and not smaller than 5 mm but not greater than 20 mm in length in order to restrain the vibration mode generated on the disk tray 2 and the air flow generated between the disk 20 and the disk tray 2 when the disk 20 is turned.

FIG. 2 shows a state in which the disk tray 2 is pulled deeper into the disk drive device 1. The guide mechanisms 13 are disposed on both right and left ends of the bottom cover 8, and these guide mechanisms 13 support the disk tray 2. The main circuit board 10 fitted to the rear part of the bottom cover 8 is provided with a connector part 14 to be electrically connected to outside of the disk drive device 1. As the main circuit board 10 is positioned underneath the disk tray 2, the main circuit board 10 is represented in this FIG. 2 by broken lines, and the disk tray by a solid line, to make their contours clearly perceptible.

The size of the recess 21 closely relates to the suppression of the self-excited vibration of the disk tray 2 and to the reduction of the noise generated by the high-speed revolution of the disk 20. Therefore, the appropriate size of the recess 21 was figured out in the following manner. The width of the recess 21 is represented by W, and its length by X. Since the size of the IC component 11 is 5 mm at the minimum and 20 mm at the maximum if it is a usual IC, the permissible range of the width W will be in a range of 15 mm to 30 mm both inclusive if a margin of 5 mm is given on each side of the IC component 11. The length X of the recess 21 is determined in the following way, with the vibration mode and noise characteristics being taken into account.

FIG. 3A shows the noise level of the disk drive device 1 when the length X of the recess 21 formed in the disk tray 2 is varied at 5 mm intervals in a range of X=0 to 25 mm both inclusive when the recess width W is 30 mm. In this graph, X=0 mm means a state in which no recess 21 is formed, and each noise level represents the difference from the noise level in this state of X=0 mm. In this FIG. 3A, vibration acceleration levels with reference to X=0 mm are also shown.

FIG. 3B shows a top view of the disk tray 2. This diagram is intended to illustrate vibration characteristics. In these diagrams, the disk drive device 1 is supposed to be driven at a speed equivalent to 24-fold faster reproduction of a CD-ROM. Thus, the turning speed of the disk is about 5500 revolutions per minute.

The relative noise level decreases until the length X of the recess 21 in the disk tray 2 reaches 10 mm, is at its minimum where X is equal to 10 mm and increases when X surpasses 10 mm. The increase of noise with the elongation of the recess 21 beyond 10 mm is due to rigidity variations in different parts of the disk tray 2 resulting from the formation of the recess 21.

Among the factors contributing to noise level variations where the length X of the recess 21 of the disk tray 2 is X≦10 mm, the influence of local vibration indicated by a dotted line in FIG. 3A is dominant. In this state, the high-speed revolution of the disk makes the air flow turbulent, and this turbulent air flow excites vibration of the disk tray 2. The local vibration is a phenomenon in which part of the disk tray 2 is self-excited and resonates, and the greatest vibration is observed in the vicinity of the front panel 16.

In the state of X=0, i.e. in the absence of the recess 21, the part where the unit mechanism 3 is fitted (the shaded part 2*b* in FIG. 3B) is a space, and thus, the rigidity of the disk tray 2 varies in the direction toward inside of the disk tray 2 from the front panel 16 (the vertical direction in FIG. 3B). In other words, the rigidity of the forward part, which is on the front panel 16 side, extremely weakens to invite local resonance. On the other hand, the formation of the recess 21 also weakens the rigidity of the inner part of the disk tray 2, resulting in a reduced difference in rigidity in the disk loading direction (the vertical direction in FIG. 3B), and the local resonance is thereby suppressed.

When the length X of the recess 21 of the disk tray 2 is greater than 10 mm, the influence of the flexural vibration, represented by another dotted line in FIG. 3A, on the noise level becomes greater. In this case, too, the vibromotive force working on the disk tray 2, like that arising when the recess length X is short, derives from the air flow due to the high-speed revolution of the disk. With an increase in the length X of the recess 21 formed in the disk tray 2, there occurs a decrease in rigidity on the line 2*d* connecting between the shaded part 2*b*, where the unit mechanism 3 is fitted, and the recess 21. The disk tray 2 is caused by an external vibromotive force to generate self-excited vibration by the primary bending vibration mode having the low-rigidity portion as its belly. This vibration of the disk tray 2 increases the noise of the disk drive device 1. This means that the balance between the shaded part 2*b* and the length X of the recess 21 formed in the disk tray 2 should be taken into account in determining the length X.

Any abnormal vibration occurring in the disk tray 2 would not only increase the noise of the disk drive device 1 and accordingly reduce its reliability, but also excite vibration of other components of the disk drive device 1 thereby to deteriorate the recording/reproduction performance of the disk drive device 1. In order to prevent the disk drive device 1 from generating such abnormal vibration, the permissible magnitude of vibration within the disk drive device 1 is provided as a standard of reliability. According to this provision, the internal vibration of a thin disk drive device 1 should not exceed 2 $m/s^2$.

Since the permissible limit of local resonance of the disk tray 2 according to this provision is −0.2 dB (relative level), the length X of the recess 21 should not be smaller than 5 mm. On the other hand, since the permissible limit of the flexural vibration of the disk tray 2 is 2 $m/s^2$, the length X of the recess 21 should not be more than 20 mm. Therefore, with the permissible level of noise and that of vibration taken into account, it is desirable for the length X of the recess 21 in the disk tray 2 to be in a range of 5 mm to 20 mm both inclusive.

FIG. 4A shows a top view of the disk tray 2. This disk tray 2 is in a state of being assembled with the unit mechanism 3. At the bottom of the circular groove 2*a* which is formed in the disk tray 2 and is slightly larger than the outer diameter of the disk 20, there are formed a hole for movement 2*c* for the optical head 6 and the recess 21. When the disk 20 is mounted on the turntable of the spindle motor 5, the gap between the under face of the disk 20 and the bottom face of the circular groove in the disk tray 2 facing the under face of the disk 20 becomes substantially uniform. However, the gap abruptly widens in the two hole portions including the hole for movement 2*c* and the recess 21, and in these portions where the gap abruptly varies, the air flow becomes turbulent. As a result, the aerodynamic vibromotive force increases to excite ambient components, resulting in increased structural vibration noise and in increased aerodynamic sound due to the turbulent flow.

In view of this problem, since the hole 2*c* is indispensable in the disk drive device 1 to enable the optical head 6 in this embodiment to move, the size and position of this hole 2*c* are taken into account in determining the size of the recess 21. Thus, the areas of the hole 2*c* and of the recess 21 are substantially equalized. In FIG. 4A, the optical head 6 is illustrated to be positioned on the inner circumference side. When the optical head 6 which was on the inner circumference side moves toward the outer circumference, part of the optical head 6 enters underneath the disk tray 2 to somewhat expand the apparent area of the hole 2*c*.

Air pressure variations between the disk 20 and the disk tray 2 here are dependent on the peripheral velocity of the disk. Since the recess 21 is positioned on the outer circumference side of the disk 20, when the optical head 6 is positioned on the inner circumference side, the peripheral velocities of the hole 2*c* located on the outer circumference side of the disk and of the recess 21 become substantially equal. Therefore, by approximately equalizing the areas of the hole 2*c* and of the recess 21, the air pressure variations of the disk 20 and of the disk tray 2 are substantially cancelled with each other. When the optical head 6 moves toward the outer circumference, the hole 2*c* is positioned toward the inner circumference. Since the peripheral velocity of the disk is slower on the inner circumference side, the area of the hole 2*c* can be set greater than that of the recess 21 to achieve the purpose.

The area of the hole 2*c* for the optical head 6 is determined by the net running distance H2 of the optical head 6 not including its own length H1 and the width W1 of the hole 2*c*. Since the effective length of the hole 2*c* in the radial direction (the length in the traveling distance of the optical head 6) is 20 mm and the width of the hole 2*c* is around 15 mm, the area of the hole 2*c* is approximately 300 $mm^2$. Therefore, the area of the recess 21 matching this hole 2*c* is about 300 $mm^2$. As shown in FIGS. 1 and 2 with reference to this embodiment, the desirable width of the recess 21 is about 30 mm, and accordingly the proper length of the recess 21 is around 10 mm. This result agrees well with FIG. 3A showing the characteristics of the air flow.

As mentioned above, the formation of the hole 2*c* and the recess 21 results in turbulence of the air flow due to the abrupt variation of the gap, inviting an increase in structural vibration noise and a rise in aerodynamic sound due to the air flow turbulence. Therefore, with a view to further reduction of noise and vibration, the hole 2*c* for the optical head 6 and the recess 21 are positioned as nearly symmetric as practicable with respect to the rotation axis of the disk 20. This enables the air flow generated by the hole 2*c* and the recess 21 to be brought close to a point-symmetric distribution on the surface of the disk 20, and excitation due to the asymmetric vibration mode of the disk 20 can be thereby suppressed. Furthermore, local resonance of the disk tray 2 and the accompanying structural vibration noise can be suppressed.

FIG. 4B shows a modification of the embodiment described above. This FIG. 4B shows a sectional view matching a section along line IVB-IVB in FIG. 4A. The revolution 26 of the disk gives rise to an air flow 27 between the disk 20 and the disk tray 2 in the leftward direction in the illustration. In this FIG. 4B, the disk 20 is also shown. The revolving direction of the disk 20 is indicated by arrow 26 above the disk 20.

In this modified embodiment, a downward taper 22 is formed on a side wall of the recess 21 in the disk tray 2. As the side wall of the disk tray 2 is inclined, the gap variation between the disk tray 2 and the disk 20 is eased, and the flow can be therefore prepared. In the recess 21, air flows in along a perpendicular wall face 22*b* (on the right side of the drawing), and flows out along the tapered face 22. If the wall face on the outlet side were perpendicular, the air flow having entered into the recess 21 would collide with the wall face, and vortexes would arise in the recess 21. These vortexes would become the source of local vibromotive force. In this modified embodiment, the presence of the taper 22 serves to suppress the turbulence of the air flow having entered into the recess 21 and thereby to reduce the self-excited vibration of the disk tray 2. This also results in reduction of the structural vibration noise.

Incidentally, though the taper 22 is supposed to be formed only on the air outlet side of the recess 21 in this embodiment, if a downward taper is also formed on the inlet side wall face 22*b* of the recess 21, the generation of vortexes which would generate vibration can be further suppressed. Though the wall face is tapered (inclined) here, any shape which could facilitate smooth flowing of air in and out the recess 21 may be used, such as a shape having a round curvature.

FIG. 5 illustrates a disk tray, which is another preferred embodiment of the invention. FIG. 5 shows a top view of the disk tray 2 into which the unit mechanism 3 is incorporated. At the bottom of the circular groove 2*a* which is slightly greater than the outer diameter of the disk 20 and is formed in the disk tray 2, the hole 2*c* for the optical head 6 and a recessed hole 23 are formed. The recessed hole 23 is formed in the vicinity of the deeper end of the disk tray 2 and substantially at the center. This recessed hole 23 is provided to control the vibration mode of the disk tray 2 and to suppress the air flow between the disk 20 and the disk tray 2.

Since the recessed hole 23 has a bridging portion 24 as a rigid reinforcement for connecting the disk tray 2 on the outer circumference of the disk tray 2, it is more rigid than the recess 21 described with reference to FIG. 2 and FIG. 3 in terms of the primary bending mode of the disk tray 2. Therefore, it can suppress the amplitude of the primary bending vibration of the disk tray 2 and reduce the structural vibration noise. By setting the area of the recessed hole 23 substantially equal to that of the hole 2*c* for the optical head 6 and positioning it in substantial axial symmetry with respect to the axis of the spindle motor 5, the turbulence of the air flow generated by the hole 2*c* and the recessed hole 23 comes close to axial symmetry on the surface of the disk 20. Therefore, the disk 20 can be prevented from exciting an asymmetric vibration mode. Since the local resonance of the disk tray 2 is restrained, the structural vibration noise can be suppressed.

FIG. 6 shows a disk tray 2, which is still another preferred embodiment according to the invention. FIG. 6 shows a top view of a disk drive device 1, with its top cover 9 removed. In this embodiment, the recess is even closer to the position of axial symmetry with the hole 2*c* than in the embodiment shown in FIG. 5. Thus, the recess 21 of the disk tray 2 is formed on a straight line 2*d* in a corner deeper inside (the upper right corner in FIG. 6), which is a position of symmetry with the hole 2*c*. Since the recess 21 is formed in the disk tray 2 in this embodiment, the side 2*f* facing a side of the disk is absent only in this recess 21 portion. Therefore, a side wall member 25 matching the side 2*f* is disposed on either the bottom cover 8 or the top cover 9.

In this embodiment, as the hole 2*c* of the optical head 6 and the recess 21 in the disk tray 2 are formed in axial symmetry with respect to the disk, the noise arising from the revolution of the disk can be reduced. If the area of the recess 21 is set substantially equal to that of the hole 2*c* which is positioned on the inner circumference of the optical head 6 with this positional relationship being retained, the noise arising from the revolution of the disk can be further reduced. At the same time, the vibration of the disk tray 2 can be suppressed, resulting in enhanced reliability of the disk device.

It should be further understood by those skilled in the art that the foregoing description has been made on embodiments of the invention and that various changes and modifications may be made in the invention without departing from the spirit of the invention and the scope of the appended claims.

The invention claimed is:

1. A disk drive device using an optical head for recording information into or reproducing information out of a disk comprising:

a spindle motor for rotationally driving the disk;

moving means for driving the optical head in a radial direction of the disk, and a circuit board on which a control unit for controlling said optical head and said moving means is formed, wherein a recess is formed in an outer circumference of a disk tray for carrying a disk in and out, the recess serving to suppress at least either one of a vibration mode of this disk tray and air flow between the disk and the disk tray, wherein the circuit board is arranged at a deeper end of the disk tray in its moving direction, and said recess is formed above said circuit board, wherein at least part of the recessed wall of said recess, the recessed wall being in a direction substantially at a right angle to the direction of the air flow generated by the revolution of the disk, is tapered.

* * * * *